(12) United States Patent
Garcia-Ferre et al.

(10) Patent No.: US 12,252,023 B2
(45) Date of Patent: Mar. 18, 2025

(54) SYSTEM AND A METHOD FOR ENSURING A DEFINED POSITION OF A CHARGING CONNECTOR AND/OR FOR DETERMINING ITS MECHANICAL CONDITION

(71) Applicant: ABB E-mobility B.V., Delft (NL)

(72) Inventors: Francisco Garcia-Ferre, Baden (CH); Jean-Marc Oppliger, Fislisbach (CH)

(73) Assignee: ABB E-mobility B.V., Delft (NL)

( * ) Notice: Subject to any disclaimer, the term of this patent is extended or adjusted under 35 U.S.C. 154(b) by 574 days.

(21) Appl. No.: 17/583,399

(22) Filed: Jan. 25, 2022

(65) Prior Publication Data

US 2022/0144109 A1 May 12, 2022

Related U.S. Application Data

(63) Continuation of application No. PCT/EP2020/055350, filed on Feb. 28, 2020.

(30) Foreign Application Priority Data

Jul. 25, 2019 (EP) .................................... 19188487

(51) Int. Cl.
*H02J 7/00* (2006.01)
*B60L 53/16* (2019.01)
(Continued)

(52) U.S. Cl.
CPC ............... *B60L 53/16* (2019.02); *B60L 53/31* (2019.02); *B60L 53/35* (2019.02);
(Continued)

(58) Field of Classification Search
CPC .......... B60L 53/16; B60L 53/31; B60L 53/35; B60L 2250/10; H01R 13/6683; H02J 7/0042
(Continued)

(56) References Cited

U.S. PATENT DOCUMENTS

| 2012/0091824 A1* | 4/2012 | Campolo | ................. B60L 53/16 307/135 |
| 2013/0169227 A1* | 7/2013 | Tremblay | ............... B60L 53/305 320/109 |
| 2014/0015487 A1* | 1/2014 | Brown | .................. B60L 3/0092 320/109 |

FOREIGN PATENT DOCUMENTS

| CN | 102094966 A | 6/2011 |
| CN | 104411532 A | 3/2015 |

(Continued)

OTHER PUBLICATIONS

European Patent Office, International Search Report in International Patent Application No. PCT/EP2020/055350, 3 pp. (May 4, 2020).

(Continued)

*Primary Examiner* — Zixuan Zhou

(74) *Attorney, Agent, or Firm* — Leydig, Voit & Mayer, Ltd.

(57) ABSTRACT

A system and method for ensuring a defined position of a charging connector includes a signal transmitter, a corresponding signal detector unit for detecting the signal of the signal transmitter, and a holder for holding the charging connector in the defined position. A detector device detects an orientation and/or movement of the charging connector in an environmental coordinate system. The system detects a presence of the charging connector in the defined position and determines the mechanical condition of the interface or a housing of the charging connector via the signal of the signal transmitter, and compares the orientation and/or movement of the charging connector with a corresponding orientation and/or movement of the charging connector to be expected when the charging connector is in the defined position.

15 Claims, 2 Drawing Sheets

Figure 3:
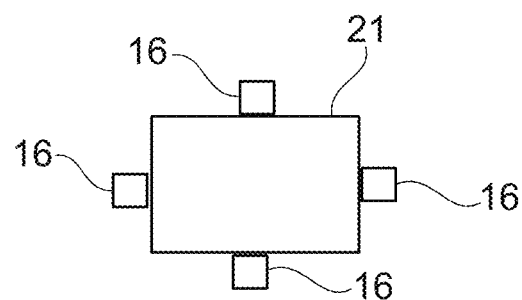

(51) Int. Cl.
*B60L 53/31* (2019.01)
*B60L 53/35* (2019.01)
*H01R 13/66* (2006.01)

(52) U.S. Cl.
CPC ........ *H01R 13/6683* (2013.01); *H02J 7/0042* (2013.01); *B60L 2250/10* (2013.01)

(58) Field of Classification Search
USPC ........................................................ 320/109
See application file for complete search history.

(56) References Cited

FOREIGN PATENT DOCUMENTS

| | | |
|---|---|---|
| CN | 105682978 A | 6/2016 |
| CN | 105977722 A | 9/2016 |
| CN | 106470869 A | 3/2017 |
| CN | 107672474 A | 2/2018 |
| CN | 107749532 A | 3/2018 |
| CN | 108365394 A | 8/2018 |
| CN | 108621856 A | 10/2018 |
| CN | 208714981 U | 4/2019 |
| DE | 102009044179 A1 | 12/2010 |
| DE | 202009013675 U1 | 3/2011 |
| DE | 102017113162 A1 | 12/2018 |
| DE | 102017123357 A1 | 4/2019 |
| DE | 102017125108 A1 | 5/2019 |
| EP | 0634818 A2 | 1/1995 |
| JP | 3217205 U | 7/2018 |

OTHER PUBLICATIONS

European Patent Office, Written Opinion in International Patent Application No. PCT/EP2020/055350, 6 pp. (May 4, 2020).

* cited by examiner

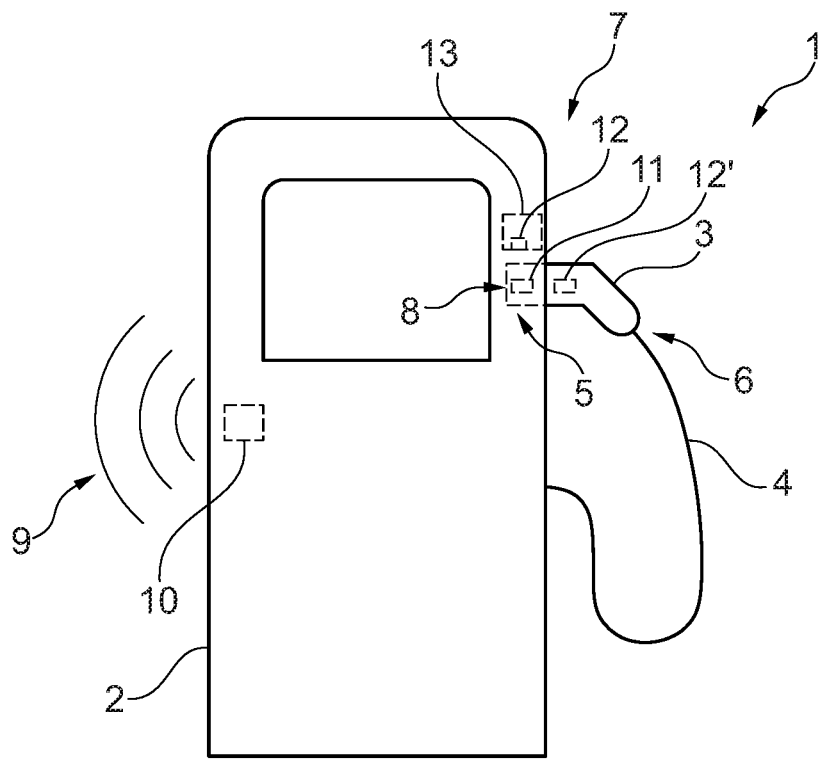
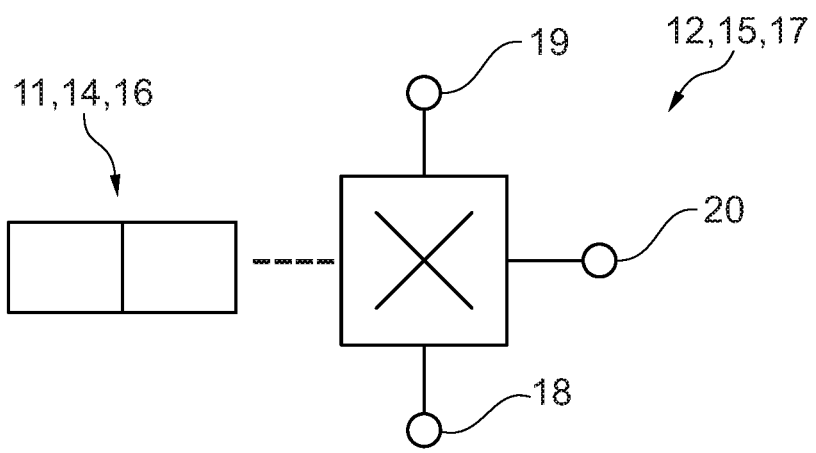

SYSTEM AND A METHOD FOR ENSURING A DEFINED POSITION OF A CHARGING CONNECTOR AND/OR FOR DETERMINING ITS MECHANICAL CONDITION

CROSS-REFERENCE TO RELATED APPLICATIONS

This patent application is continuation of International patent application no. PCT/EP2020/055350, filed on Feb. 28, 2020, which claims priority to European patent application 19188487.3, filed on Jul. 25, 2019, both of which are incorporated herein by reference.

FIELD OF THE DISCLOSURE

The present disclosure relates to a system and a method for ensuring a defined position of a charging connector for electrically charging an electric vehicle or hybrid vehicle in a charge-free time when an interface of the charging connector is not connected to the vehicle and/or for determining the mechanical condition of said interface. The disclosure further relates to a corresponding charging device for electrically charging an electric or hybrid vehicle.

BACKGROUND OF THE INVENTION

Document DE 10 2017 123 357 A1 describes a charging device for electrically charging a vehicle with an electric or hybrid drive (electric or hybrid vehicle). The charging device comprises a charging station unit, a charging connector with an interface and a cable connecting the charging connector to the charging station unit.

For charging the vehicle, e.g. a car, the interface of the charging connector is connected to a counter-part, ordinarily of the vehicle to be charged. After charging, the connector is sometimes not properly stowed and one of the vehicles using the charging device may drive over the charging connector and damage it. This should be avoided.

If the charging connector is anyhow damaged it would be desirable that these damages could be detected automatically. In this case service operations can be planned and executed in due course, guaranteeing the service and avoiding safety risks for the end-users.

BRIEF SUMMARY OF THE INVENTION

The present disclosure generally describes a system and method for (a) ensuring a defined position of a charging connector for electrically charging an electric vehicle or hybrid vehicle in a charge-free time when an interface of the charging connector is not connected to the vehicle and/or for (b) determining the mechanical condition of said charging connector, especially the interface, the system comprising: (i) a signal transmitter, a corresponding signal detector unit for detecting the signal of the signal transmitter, and a holder for holding the charging connector in the defined position and/or (ii) a detector device for detecting an orientation and/or movement of the charging connector in an environmental coordinate system.

The system is arranged for detecting the presence of the charging connector in the defined position and/or for determining the mechanical condition of the interface or a housing of the charging connector (i) via the signal of the signal transmitter as detected by the signal detector unit and/or (ii) a comparison between the orientation and/or movement of the charging connector detected by use of the detector device and a corresponding orientation and/or movement of the charging connector to be expected when the charging connector is in the defined position. Depending on the structure of the signal transmitter and signal detector unit and the detector device respectively, the receiving signal may contain information about the presence of the connector as well as the spatial structure of the connector. There are now several ways to realize this. However, the analysis of the signal received via the detector unit/detector device is decisive. The main difference between these two sensors is the kind of signal which is used to ensure the defined position of the charging connector and to determine the mechanical condition of the charging connector. In case (i) an additional signal transmitter is mounted. In case (ii) a given signal is used. The sensor is preferably a spatially resolving sensor.

In one embodiment, the system further comprises an analyzing unit for analyzing the signal detected by the signal detector unit to detect the presence of the charging connector in the defined position and/or to determine the mechanical state of the interface of the charging connector and/or a comparison unit for performing the comparison between the detected orientation and/or movement and the corresponding orientation and/or movement of the charging connector to be expected when the charging connector is in the defined position.

According to another embodiment, the signal transmitter and/or the signal detector unit is arranged on the side of the holder.

According to yet another embodiment, the signal transmitter and the signal detector unit are (a) a magnetic signal transmitter and a magnetic signal detector or (b) an optical signal transmitter and an optical signal detector, especially of a light barrier type sensor.

The magnetic signal detector may be at least one of: a hall sensor, an XMR sensor, and a fluxgate sensor. These are typical types of magnetic sensors. The XMR sensor can be an AMR sensor (AMR: Anisotropic Magneto-Resistive), a GMR sensor (GMR: Giant Magneto-Resistance), a TMR sensor (TMR: Tunnel Magneto-Resistance).

In another embodiment, the detector device for detecting an orientation and/or movement of the charging connector comprises a gyroscopic unit and/or an accelerometer unit. The detector device is preferably mountable in the charging connector.

According to yet another embodiment, the system further comprises an alarming unit for outputting an alarm signal, in particular an optical and/or acoustic alarm signal, if the presence of the charging connector in the defined position is not detected by the detector unit after a specific period of idle time. For this purpose the alarming unit comprises a corresponding interface for signal output.

BRIEF DESCRIPTION OF THE SEVERAL VIEWS OF THE DRAWING(S)

Various aspects of the invention will be apparent from and elucidated with reference to the embodiments described hereinafter.

Figure 4:
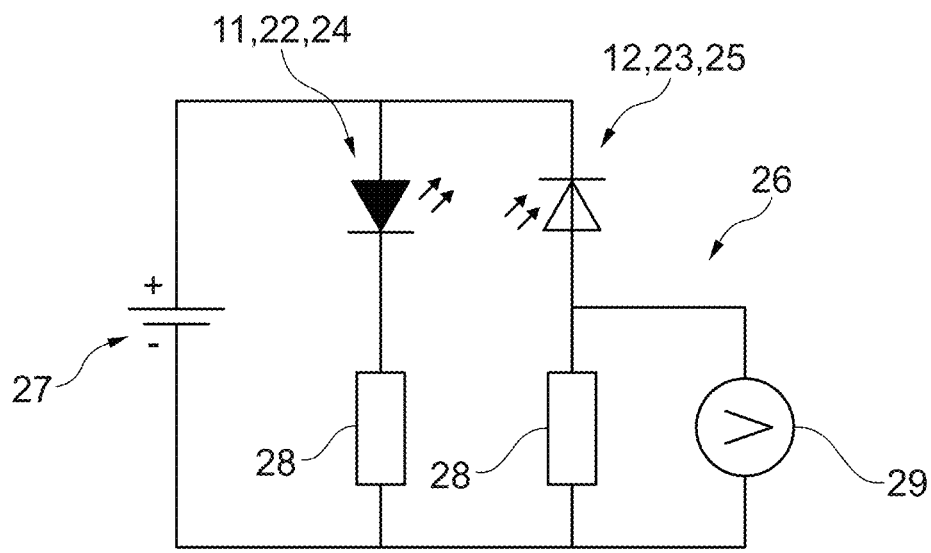
Figure 5:
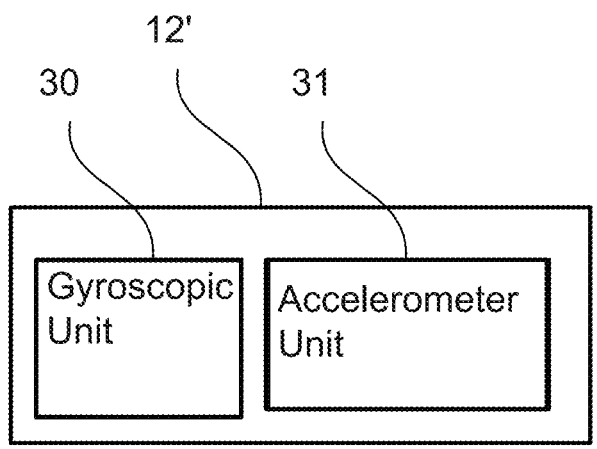

In the drawings:

FIG. 1 shows a charging device for electrically charging an electric or hybrid vehicle according to a preferred embodiment in a schematic view, FIG. 2 shows a detector of a system for detecting the charging connector of the charging device in a schematic view, FIG. 3 shows the arrangement of signal transmitters of the detector shown in FIG. 2, FIG. 4 shows an alternative detector for detecting a charging connector of the charging device, and FIG. 5 shows a schematic representation of an embodiment of a detector device for detecting an orientation and/or movement of the charging connector in an environmental coordinate system.

DETAILED DESCRIPTION OF THE INVENTION

In one aspect, the present disclosure describes a charging device for electrically charging an electric or hybrid vehicle, in particular a charging column, comprising a charging connector for electrically charging an electric vehicle or hybrid vehicle, a holder for holding the charging connector in a charge-free time in a defined position, and an aforementioned system for ensuring a defined position of a charging connector for electrically charging an electric vehicle or hybrid vehicle in a charge-free time when an interface of the charging connector is not connected to the vehicle.

In one embodiment, the charging device according to the disclosure operates such that (i) the signal transmitter is arranged on the connector side and the detector unit is arranged on the holder side or (ii) the detector unit is arranged on the connector side and the signal transmitter is arranged on the holder side, or (iii) the signal transmitter and the detector unit are arranged on the holder side.

In another preferred implementation of the charging device according to the disclosure said charging device further comprises a charging station unit and a cable connecting the charging connector to the charging station unit. Preferably the charging station unit comprises at least one of the holder, the analyzing unit, and the alarming unit.

In another aspect the present disclosure describes a method for ensuring a defined position of a charging connector for electrically charging an electric or hybrid vehicle in a charge-free time when an interface of the charging connector is not connected to the vehicle and/or for determining the mechanical condition of said charging connector, especially the interface, wherein the method is carried out by use of a system, which system comprises: (i) a signal transmitter, a corresponding signal detector unit for detecting the signals of the signal transmitter, and a holder to hold the charging connector in the defined position, and/or (ii) a detector device for detecting an orientation and/or movement of the charging connector in an environmental coordinate system, wherein the presence of the charging connector in the defined position is detected and/or the mechanical condition of the interface or a housing of the charging connector is detected via (i) the signal of the signal transmitter as detected by the signal detector unit and/or (ii) a comparison between the orientation and/or movement of the charging connector detected by use of the detector device and a corresponding orientation and/or movement of the charging connector to be expected when the charging connector is in the defined position. Said system especially is an aforementioned system for (a) ensuring a defined position of a charging connector for electrically charging an electric vehicle or hybrid vehicle in a charge-free time when an interface of the charging connector is not connected to the vehicle and/or for (b) determining the mechanical condition of said charging connector, especially the interface.

Depending on the structure of the signal transmitter and signal detector unit, the receiving signal can contain information about the presence of the connector as well as the spatial structure of the charging connector. The analysis of the signal received via the detector unit is now decisive.

According to a preferred embodiment of the method according to the disclosure the signal detected by the signal detector unit is analyzed to detect the presence of the charging connector in the defined position and/or to determine the mechanical state of the interface of the charging connector.

FIG. 1 shows a charging device 1 for electrically charging an electric or hybrid vehicle (not shown). The charging device 1 comprises a charging station unit 2 (sometimes called charging post), a charging connector 3 and a cable 4 connecting the charging connector 3 to the charging station unit 2. The charging station unit 2 comprises a holder 5 for holding the charging connector 3 in a storage position on one side of the charging station unit 2. This storage position is a e holder 5 defines for the connector 3. This storage position is a defined position 6 of the charging connector 3 in a charge-free time when the charging connector 3 is not connected to a vehicle. The charging device 1 further comprises a system 7 with two main tasks: 1. Ensuring the defined position 6 of the charging connector 3 in a charge-free time when an interface 8 of the charging connector 3 is not connected to the vehicle and 2. determining the mechanical condition of said interface 8. For ensuring the defined position 6 of the charging connector 3 the system 7 detects the presence of the charging connector 3 in the defined position and puts out an alarm signal 9 by use of an alarming unit 10, in particular an acoustic alarm signal, if the presence of the charging connector 3 in the holder 5 is not detected by the system 7 after a specific period of idle time after disconnecting the charging connector 3 from the vehicle. The system comprises a signal transmitter 11, a signal detector unit 12, and an analyzing unit 13 for detecting the presence of the charging connector 3. In other words: the system 7 monitors by use of these two components 11, 12 whether the connector 3 is at the defined position/location 6. In the shown example the signal transmitter 11 is mounted on side of the charging connector 3 and the signal detector unit 12 is mounted on side of the holder 5. Additionally the charging connector 3 comprises a detector device 12" for detecting an orientation and/or movement of the charging connector 3 in an environmental coordinate system. For this purpose the detector device 12' comprises a gyroscopic unit and/or an accelerometer unit (shown in detail in FIG. 5). The detector device 12' detects the position of the charging connector 3 in the surrounding system. The corresponding angle is different when the connector 3 is in the holder 5 of the charger, in the vehicle, e.g. car, or on the ground.

FIG. 2 shows the arrangement of the signal transmitter 11 and the signal detector unit 12 in a schematic view. In the shown example the signal transmitter 11 is a magnetic signal transmitter 14 and a corresponding signal detector unit 12 is a magnetic signal detector unit 15 for detecting the magnetic signal of the magnetic signal transmitter 14. The magnetic signal transmitter 14 is a permanent magnet 16 generating magnetic stray fields, which are the magnetic signal. The magnetic signal detector unit 15 is a hall sensor (hall effect sensor) 17 for detecting/measuring these fields. The hall sensor 17 comprises electrical connections 18, 19 for feeding in a current and connection(s) 20 for measuring the corresponding Hall voltage. The arrangement 11, 12 detects the presence of the charging connector 3 at the defined position 6 at the holder 5 by receiving the signal of the signal transmitter 11 by means of the signal detector unit 12.

Depending on the structure of the signal transmitter 11 and signal detector unit 12, the received signal may contain information about the spatial structure of the connector 3 and especially its interface 8 in addition to the information of the presence of the connector 3.

FIG. 3 shows a concrete arrangement of permanent magnets 16 to generate a magnetic signal which also provides information on the mechanical state/condition of the (mating) interface 8 of the connector 3. Four permanent magnets 16 are surrounding a latch structure (in the example a latch hole) 31 of the charging connector 3. The position of such latch structures 21 are e.g. known from the cited document DE 10 2017 123 357 A1.

In other words, small permanent magnets 16 are placed surrounding the latch structures 21 of the mating interface 8. In parallel, an electrical circuit board with signal detector unit 12 (e.g. Hall sensor 17) and analyzing unit 13 is placed in the charging post (see scheme in FIG. 1). When the charging connector 3 is not used for charging, and is correctly position in the charging station unit 2, the signal detector unit 12 will identify the correct position. Moreover, using an algorithm on the charge post electronics/analyzing unit 13, the system 7 will measure any deviation in the distance between the magnets 15 surrounding the latch hole(s) 21. A deviation higher than a given threshold will indicate damage to the interface 8. In addition, if the connector 3 is not positioned correctly in the holder 5, the magnetic signal detector 15/Hall sensor 17 will notice this, and is connected to the visual and/or acoustic alarming unit 10 (for example, a red light, together with a loud acoustic alarm). The alarming unit 10 will be activated and will force the user to put the connector 3 in the right position on the charging post 2, namely at the holder 5.

FIG. 4 shows another embodiment of the system 7. In the shown example the signal transmitter 11 is an optical signal transmitter 22 and the corresponding signal detector unit 12 is an optical signal detector unit 23 for detecting the optical signal of the optical signal transmitter 22. The optical signal transmitter 22 and the optical signal detector unit 23 are forming a light barrier 22, 23 wherein the optical signal transmitter 22 is a light emitting diode (LED) 24 and the optical signal detector unit 23 is a photodiode 25. The shown wiring 26 with DC-Supply 27, resistors 28 and voltmeter 29 is typical for light barriers.

The second embodiment is to place light sources/optical signal transmitters 22 and light sensors/optical signal detector units 23 in the charging station unit/charging post 2, according to the scheme shown in FIG. 4. When the connector 3 is in the charging station unit/charging post 2, the (mating) interface 8 or the border of the latch structures 18 will block the light of the LEDs 24 from the photodiodes 25, acting as a wall or a shadow. If a certain threshold of luminosity is read by the optical signal detector (light sensor) 23, this would mean that the connector 3 is not at the right position, or that the mating interface 8 or the latch structure 21 are damaged. In such case, a visual and an acoustic alarm could be triggered, to force the user to position the connector 3 correctly.

FIG. 5 shows a schematic representation of an embodiment of a detector device 12' for detecting an orientation and/or movement of the charging connector 3 in an environmental coordinate system. For this purpose the detector device 12' comprises a gyroscopic unit 30 and an accelerometer unit 31. The detector device 12' detects the position of the charging connector 3 in the surrounding system. The corresponding angle is different when the connector 3 is in the holder 5 of the charger, in the vehicle or on the ground. This makes it possible to detect a precisely defined position of the charging connector 3. The accelerometer unit (acceleration sensor) 31 supplements information about abrupt movements and can be an indirect indication of damage to the body or the interface 8 of the charging connector 3.

While the invention has been illustrated and described in detail in the drawings and foregoing description, such illustration and description are to be considered illustrative or exemplary and not restrictive: the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 charging device
2 charging station unit
3 charging connector
4 cable
5 holder
6 defined position
7 system
8 interface (connector)
9 alarm signal
10 alarming unit
11 signal transmitter
12 signal detector unit
12' detector device
13 analyzing unit
14 magnetic signal transmitter
15 magnetic signal detector unit
16 permanent magnet
17 hall sensor
18 electrical connection
19 electrical connection
20 electrical connection
21 latch structure (connector)
22 optical signal transmitter
23 optical signal detector unit
24 light emitting diode
25 photodiode
26 wiring
27 DC-Supply
28 resistor
29 voltmeter
30 gyroscopic unit
31 accelerometer unit All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for ensuring a defined position of a charging connector for electrically charging an electric vehicle or hybrid vehicle in a charge-free time when an interface of the charging connector is not connected to the vehicle and/or for determining the mechanical condition of said charging connector, especially the interface, the system comprising:
   a signal transmitter,
   a corresponding signal detector unit for detecting a signal of the signal transmitter,
   a holder for holding the charging connector in the defined position, and
   a detector device for detecting an orientation and movement of the charging connector in an environmental coordinate system,
   wherein the system is arranged for detecting a presence of the charging connector in the defined position and for determining a mechanical condition of the interface or a housing of the charging connector via the signal of the signal transmitter as detected by the signal detector unit, and
   a controller configured to compare the orientation and movement of the charging connector detected by use of the detector device and a corresponding orientation and movement of the charging connector to be expected when the charging connector is in the defined position.

2. The system of claim 1, wherein the controller comprises:
   an analyzing unit for analyzing the signal detected by the signal detector unit to detect presence of the charging connector in the defined position and to determine the mechanical state of the interface of the charging connector, and
   a comparison unit for performing the comparison between the detected orientation and/or movement and the corresponding orientation and/or movement of the charging connector to be expected when the charging connector is in the defined position.

3. The system of claim 2, wherein the signal transmitter and the signal detector unit are disposed on a side of the holder.

4. The system of claim 3, wherein the signal transmitter and the signal detector unit are one of a magnetic signal transmitter and a magnetic signal detector unit, and an optical signal transmitter and an optical signal detector, especially of a light barrier.

5. The system of claim 4, wherein the magnetic signal detector unit is at least one of: a hall sensor (17), an XMR sensor, and a fluxgate sensor.

6. The system of claim 5, wherein the detector device for detecting an orientation and/or movement of the charging connector comprises at least one of a gyroscopic unit and an accelerometer unit.

7. The system of claim 6, wherein the detector device is mountable in the charging connector.

8. The system of claim 1, further comprising an alarming unit for outputting an alarm signal, in particular an optical and/or acoustic alarm signal, when the presence of the charging connector in the defined position is not detected by the signal detector unit after a specific period of idle time.

9. The system of claim 1, further comprising a charging connector for electrically charging an electric vehicle or hybrid vehicle, and a holder for holding the charging connector in a charge-free time in the defined position.

10. The system of claim 9, wherein the signal transmitter is arranged on the connector side and the detector unit is arranged on the holder side.

11. The system of claim 9, wherein the signal detector unit is arranged on the connector side and the signal transmitter is arranged on the holder side.

12. The system of claim 9, wherein the signal transmitter and the signal detector unit are arranged on the holder side.

13. The system of claim 9, further comprising a charging station unit and a cable connecting the charging connector to the charging station unit.

14. The system of claim 11, wherein the charging station unit comprises at least one of the holder, and the controller, the controller.

15. A method for ensuring a defined position of a charging connector for electrically charging an electric or hybrid vehicle in a charge-free time when an interface of the charging connector is not connected to the vehicle and/or for determining the mechanical condition of said charging connector, especially the interface, wherein the method is carried out by use of a system, the method comprising:
   providing a signal transmitter, a corresponding signal detector unit for detecting a signal of the signal transmitter, and a holder for holding the charging connector in the defined position,
   providing a detector device for detecting an orientation and/or movement of the charging connector in an environmental coordinate system,
   wherein the presence of the charging connector in the defined position and the mechanical condition of the interface or a housing of the charging connector is detected via the signal of the signal transmitter as detected by the signal detector unit, and comparing the orientation and/or movement of the charging connector detected by use of the detector device and a corresponding orientation and/or movement of the charging connector to be expected when the charging connector is in the defined position using a controller.

* * * * *